(No Model.)
J. F. MUENCHOW.
COMBINED ROLLER AND SEED PLANTER.
No. 304,445. Patented Sept. 2, 1884.
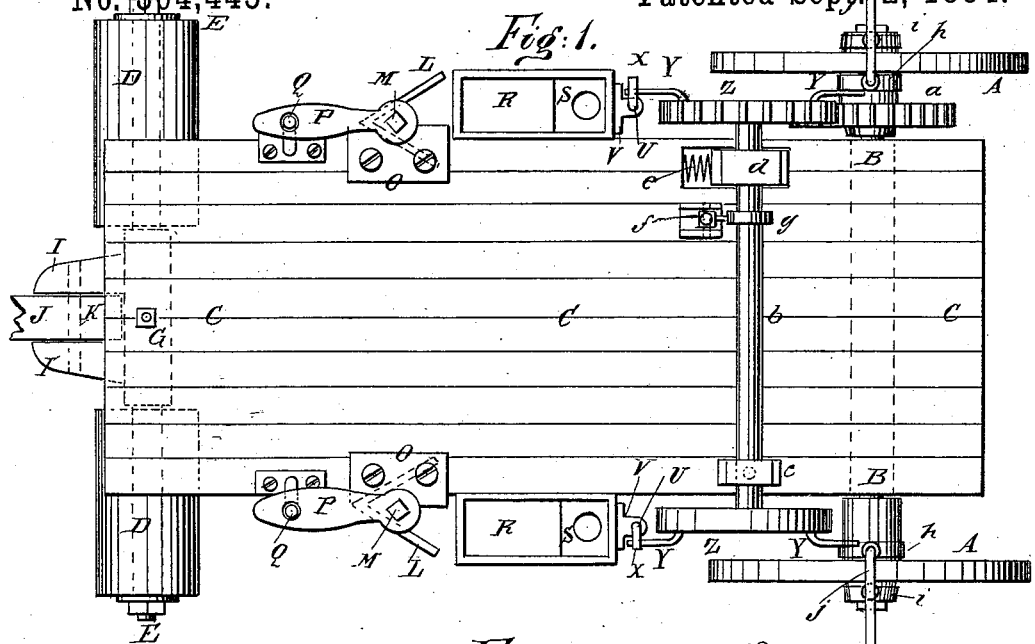
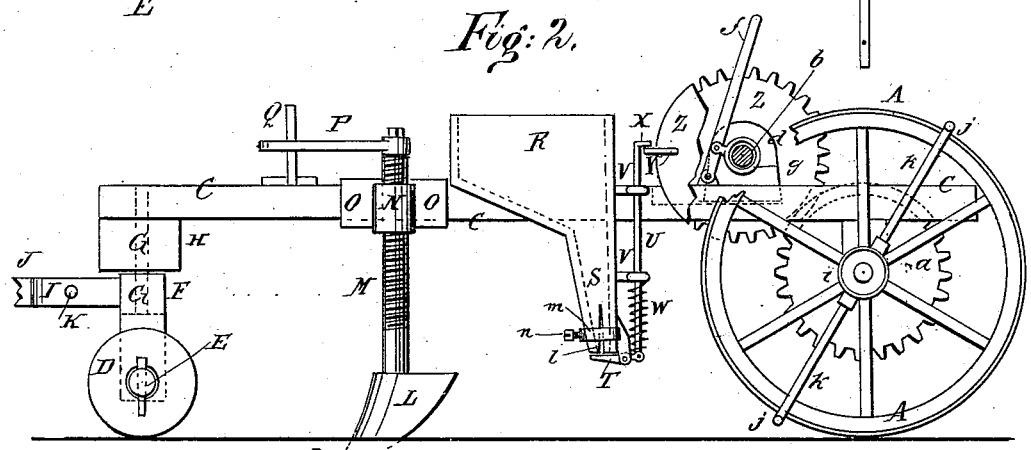
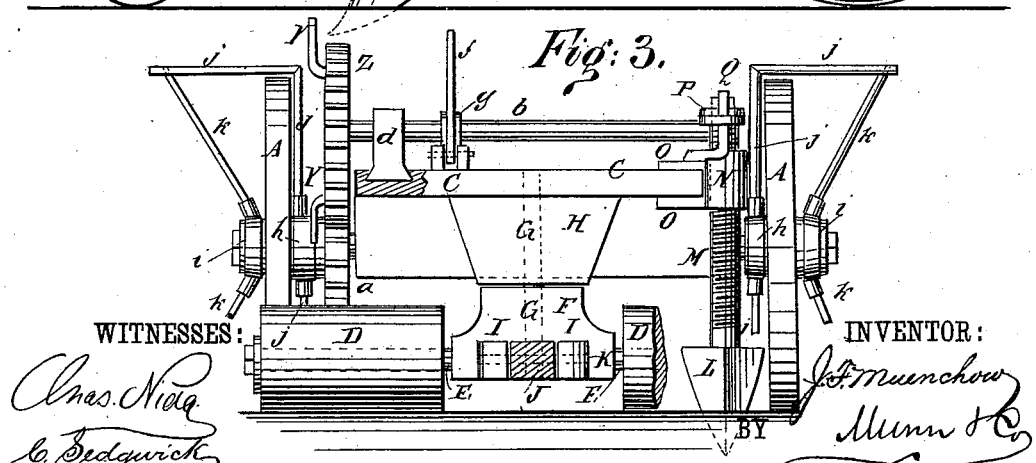
WITNESSES:
Chas. Nieda.
C. Sedgwick.
INVENTOR:
J. F. Muenchow
BY Munn & Co.
ATTORNEYS.

UNITED STATES PATENT OFFICE.

JULIUS F. MUENCHOW, OF PLAINVIEW, IOWA.

COMBINED ROLLER AND SEED-PLANTER.

SPECIFICATION forming part of Letters Patent No. 304,445, dated September 2, 1884.

Application filed April 14, 1884. (No model.)

*To all whom it may concern:*

Be it known that I, JULIUS F. MUENCHOW, of Plainview, in the county of Scott and State of Iowa, have invented a new and useful Improvement in Combined Rollers and Seed-Planters, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a side elevation of the same, parts being broken away. Fig. 3 is a front elevation of the same, partly in section, and parts being broken away.

The object of this invention is to facilitate the planting of corn and other seeds in accurate check-rows, and also to promote convenience in adjusting and controlling such planters.

The invention consists in a combined roller and seed-planter constructed with rollers having their axle connected with the platform of the machine by a king-bolt. The opening-plows have standards provided with screw-threads, placed in nuts secured to the platform of the machine, and held from turning by wrenches placed upon their upper ends, and upon pins attached to the said platform. To the platform of the machine are attached seed-boxes having discharge-spouts, closed at their lower ends by valves operated by springs, rods, arms, trip-wheels, and gear-wheels from the drive-wheel shaft, so that the seed will be dropped by the advance of the machine. The trip-wheel shaft revolves in a pivoted bearing, and in a sliding bearing held back by a spring, so that the shaft can be moved to throw the trip-wheels into and out of gear. With the trip-wheel shaft is connected a collar and lever, so that the trip-wheels can be readily thrown out of gear. Upon the hubs of the drive-wheels are placed collars provided with sockets to receive the ends of rods, the inner ones of which are bent outward across the rims of the wheels, and are connected at their outer ends with the outer ends of the other rods, so that the ground will be marked by the advance of the machine, as will be hereinafter fully described.

A is the drive-wheel, to the axle B of which is attached the rear part of the platform or frame C. The forward part of the machine is supported by two rollers, D, which revolve upon the end parts of the axle E. In the middle part of the axle E is formed or to it is attached an upward projection, F, which is pivoted by a king-bolt, G, to a head-block, H, attached to the forward end of the platform C, so that the machine can be turned in a small space.

To the forward side of the middle part of the axle E are attached hounds I, to which the tongue J is hinged by a bolt, K.

Furrows are opened to receive the seed by plows L, attached to the lower ends of the standards M, which have screw-threads formed upon them to fit into screw-threads in the nuts or bearings N. The nuts or bearings N are formed upon or attached to plates O, which are bolted to the side parts of the platform C in such positions that the plows L will be out of the way of the rollers D, when the machine is being turned. The upper ends of the standards M are squared to receive the wrenches P, by means of which the said standards M are turned to raise and lower the plows L, and thus cause the said plows to work shallower or deeper in the ground, as may be required. The handles of the wrenches P have holes formed in them to receive pins Q, attached to the platform C, to hold the standards M and plows L from turning when in use.

To the sides of the platform C, a little in the rear of the plow-standards M, are attached the seed-boxes R, the rear parts, S, of which are extended downward to serve as spouts or funnels to conduct the seed into the furrows opened by the plows L. The lower ends of the spouts S are closed by valves T, hinged to lugs attached to or formed upon the rear sides of the said lower ends of the spouts. The shanks of the valves T project, and are hinged to the lower ends of rods U, which pass up through guides V, attached to the rear sides of the spouts S and seed-boxes R. The valves T are held closed by springs W, placed upon the lower parts of the rods U, with their lower ends resting against the shanks of the said valves, and their upper ends resting against the lower guide V. The upper ends of the rods U are bent to one side to form arms X for the pins or arms Y, attached to the wheels Z, to strike against and raise the rods U, opening the valves T, and allowing the seed to drop to the ground. One of the trip-wheels, Z, is made with a smooth rim, and the other is provided with teeth, which mesh into the teeth of the gear-wheel a, attached to the axle B, so that the said trip-wheels will be revolved to open the valves T and drop the seed by the advance of the machine. The trip-wheels Z are attached to the opposite ends of the shaft b, which revolves in bearings c d, attached to the platform, C. The bearing c is secured to the platform C by a single bolt, as indicated in dotted lines in Fig. 1. The bearing d is made with a dovetailed base, which is placed in a dovetailed recess in the platform C, so that the shaft b can have sufficient lateral movement to throw the gear-wheel Z into and out of gear with the gear-wheel a. The bearing d is held back, holding the gear-wheels in gear, by a spring, l, connected with the forward end of the said bearing d, as shown in Fig. 1. By this construction one end of the shaft can be moved laterally to throw the gear-wheels Z a out of and into gear with each other. The shaft b is moved forward to throw the gear-wheels Z a out of gear by the lever f, the lower end of which is pivoted to a support attached to the platform C. The lever f is pivoted to a loose collar, g, placed upon the shaft b, as shown in the drawings.

Upon the inner and outer ends of the hubs of the drive-wheels A are placed bands h i, which have sockets upon their opposite sides. Into the sockets of the inner band, h, are screwed or otherwise secured the ends of the rods j, which extend outward radially along the inner sides of the wheels A, and are bent outward to cross the rims of the said wheels A. Into the sockets of the outer band, i, are screwed or are otherwise secured the inner ends of the rods k, the outer ends of which are secured to the outer ends of the rods j by bolts or other suitable means. By this construction, as the machine is drawn forward, the rods j will mark the ground in line with the hills, to serve as a guide to the plowman in the next crossing, so that he can plant the field in accurate check-rows. The collars h i fit the hub of the wheel so snugly that the markers will remain in place when the machine is in use, but can be readily turned to adjust the markers when starting in at the side of the field. Wedge-shaped slits l are formed in the sides of the lower ends of the funnels S, and around the said ends are placed bands m, in the forward sides of which are formed screw-holes to receive the hand-screws n, so that the size of the discharge-orifices of the funnels S can be regulated by turning the hand-screws n in or out.

The machine can be made to drop the seed closer together or in a drill by increasing the number of pins Y, attached to the wheels Z.

Having thus fully described my invention, I claim as new and desire to secure by Letters Patent—

1. In a combined seed-planter and roller, the platform C, carrying the plows L, and the axle E, swiveled to the under forward end of the platform by the king-bolt G, and provided at its opposite ends with the rollers D, arranged in front of the plows, all constructed and combined substantially as set forth.

2. In a combined roller and seed-planter, the combination, with the platform C, of the plows L, the screw-standards M, the nuts N O, and a fastening mechanism, substantially as herein shown and described, whereby the said plow-standards and plows will be securely held and can be readily adjusted, as set forth.

3. In a combined roller and seed-planter, the combination, with the platform C, the opening-plows L M, and the drive-wheel axle B, of the seed-boxes R, having spouts S, the valves T, the rods U, having arms X and springs, W, the trip-wheels Z, having pins Y, and the gear-wheel a, substantially as herein shown and described, whereby the seed will be dropped by the advance of the machine, as set forth.

4. In a combined roller and seed-planter, the combination, with the trip-wheel shaft b, of the pivoted bearing c, the sliding bearings d, and the spring e, substantially as herein shown and described, whereby the shaft can be moved to throw the trip-wheels into and out of gear with the drive-wheels, as set forth.

5. In a combined roller and seed-planter, the combination, with the trip-wheel shaft b, mounted at one end in a pivoted bearing and at the other end in a sliding bearing, of the lever f, pivoted to the platform, and the loose collar g, passing around the shaft and connected to the lever, substantially as set forth.

6. In a combined roller and seed-planter, the combination, with the hubs of the drive-wheels A, of collars h i, having sockets and the rods j k, substantially as herein shown and described, whereby the ground will be marked in line with the hills, as set forth.

JULIUS F. MUENCHOW.

Witnesses:
FRED. HEINZ,
THEO. PETERSEN.